United States Patent
Miclea et al.

(10) Patent No.: US 12,368,672 B2
(45) Date of Patent: Jul. 22, 2025

(54) FACILITATING ELASTICITY OF A NETWORK DEVICE

(71) Applicant: Juniper Networks, Inc., Sunnyvale, CA (US)

(72) Inventors: Marius Horia Marius Miclea, Epalinges (CH); Sandip Kumar Ghosh, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 372 days.

(21) Appl. No.: 17/900,447

(22) Filed: Aug. 31, 2022

(65) Prior Publication Data
US 2024/0073140 A1   Feb. 29, 2024

(51) Int. Cl.
G06F 15/16 (2006.01)
H04L 47/10 (2022.01)
H04L 47/125 (2022.01)

(52) U.S. Cl.
CPC ............ H04L 47/10 (2013.01); H04L 47/125 (2013.01)

(58) Field of Classification Search
None
See application file for complete search history.

(56) References Cited

U.S. PATENT DOCUMENTS

| | | | |
|---|---|---|---|
| 9,954,783 B1 | 4/2018 | Thirumurthi et al. | |
| 10,291,554 B1 * | 5/2019 | Ghosh | H04L 41/12 |
| 10,938,717 B1 * | 3/2021 | Sundararajan | H04L 45/64 |
| 2015/0172070 A1 * | 6/2015 | Csaszar | H04L 45/28 370/218 |
| 2020/0076684 A1 | 3/2020 | Naveen et al. | |
| 2020/0162282 A1 * | 5/2020 | Ashtaputre | H04L 45/22 |
| 2021/0112034 A1 * | 4/2021 | Sundararajan | H04L 41/0893 |
| 2021/0360401 A1 * | 11/2021 | Marinho | H04W 12/069 |
| 2022/0206908 A1 | 6/2022 | Brar et al. | |
| 2022/0231943 A1 | 7/2022 | Brar et al. | |
| 2022/0321566 A1 * | 10/2022 | Coyle | H04L 63/101 |

FOREIGN PATENT DOCUMENTS

EP   1796334 A1   6/2007

OTHER PUBLICATIONS

Extended European Search Report for Application No. EP22206281. 2, mailed on Aug. 16, 2023, 8 Pages.

* cited by examiner

*Primary Examiner* — Phuoc H Nguyen
(74) *Attorney, Agent, or Firm* — Harrity & Harrity, LLP

(57) ABSTRACT

A network device sends, via a first port of the network device and to a server device, first traffic, wherein the server device provides a NFV service line card of the network device, and wherein the first traffic is at least one of first management plane traffic associated with the NFV service line card, first control plane traffic associated with the NFV service line card, or first data plane traffic associated with the NFV service line card. The network device receives, via a second port of the network device and from the server device, second traffic, wherein the second traffic is at least one of second management plane traffic associated with the NFV service line card, second control plane traffic associated with the NFV service line card, or second data plane traffic associated with the NFV service line card.

20 Claims, 13 Drawing Sheets

FACILITATING ELASTICITY OF A NETWORK DEVICE

BACKGROUND

A network device, such as a router, typically includes one or more networking line cards and one or more service line cards. A networking line card receives and forwards traffic. A service line card provides one or more services, such as a security service, a traffic analytics service, a caching service, and/or a transcoding service.

SUMMARY

In some implementations, a network device includes one or more memories, and one or more processors to: send, via a first port of the network device and to a server device, first traffic, wherein the server device provides a network function virtualization (NFV) service line card of the network device, and wherein the first traffic is at least one of first management plane traffic associated with the NFV service line card, first control plane traffic associated with the NFV service line card, or first data plane traffic associated with the NFV service line card; and receive, via a second port of the network device and from the server device, second traffic, wherein the second traffic is at least one of second management plane traffic associated with the NFV service line card, second control plane traffic associated with the NFV service line card, or second data plane traffic associated with the NFV service line card.

In some implementations, a non-transitory computer-readable medium storing a set of instructions includes one or more instructions that, when executed by one or more processors of a network device, cause the network device to: send, via a first port of the network device and to a server device that provides an NFV service line card of the network device, first traffic associated with the NFV service line card; and receive, via a second port of the network device and from the server device, second traffic associated with the NFV service line card.

In some implementations, a method includes receiving, by a server device, from a network device, and via a first port of the server device, first traffic, wherein the server device provides an NFV service line card of the network device, wherein the first traffic is associated with the NFV service line card; generating, by the server device and based on the first traffic, second traffic associated with the NFV service line card; and sending, by the server device, to the network device, and via a second port of the server device, the second traffic.

DETAILED DESCRIPTION

Figure 1A:
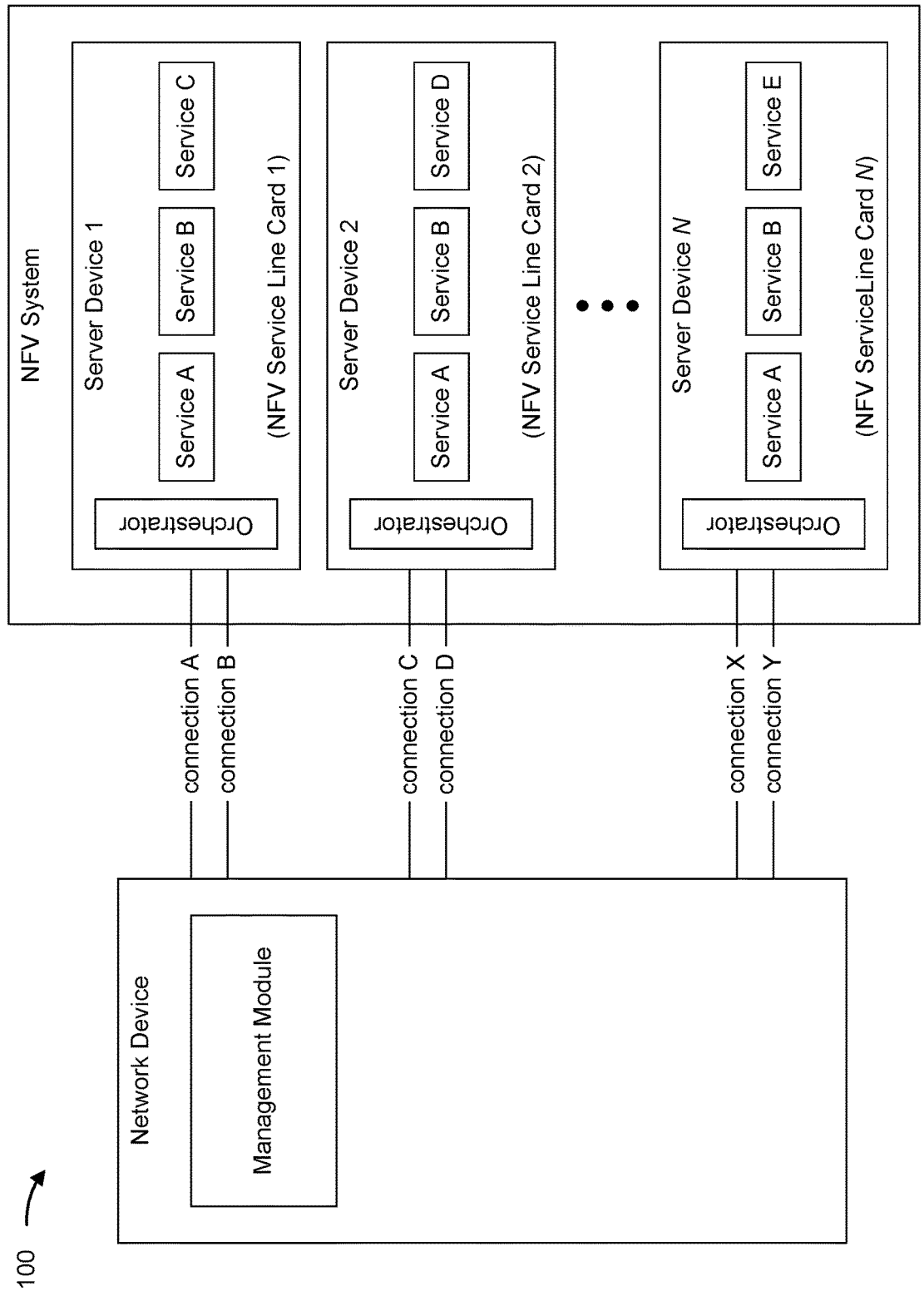
FIGS. 1A-1H are diagrams of one or more example implementations described herein.

The following detailed description of example implementations refers to the accompanying drawings. The same reference numbers in different drawings may identify the same or similar elements.

A network device typically performs two different types of work: forwarding work, such as determining a destination to which to forward traffic, and forwarding the traffic; and computing work to provide one or more services, such as a security service, an encryption service, an address translation service, and/or another service (e.g., to process and/or modify traffic before forwarding the traffic). In many cases, the network device may include one or more sets of line cards (where a line card includes a flexible physical interface card concentrator (FPC), a physical interface card (PIC), and/or another type of line card) to perform the two different types of work. For example, the network device may include one or more networking line cards that are each configured to receive and forward traffic, and one or more service line cards that are each configured to provide a service (or services). However, in many cases, the one or more network line cards and the one or more service line cards may comprise application specific integrated circuit (ASICs) line cards, which provide an optimal performance carrying out the forwarding work of the network device as networking line cards, but provide a suboptimal performance carrying out the computing work of the network device as service line cards. This may result in a waste of computing resources (e.g., processing resources, memory resources, communication resources, and/or power resources, among other examples) of the network device and/or the one or more service line cards.

In some cases, a specialized (non-ASIC) line card, such as a line card that utilizes an x86 architecture, can be used as a service line card to carry out the computing work. However, such a specialized line card is complex to design, manufacture, install, and maintain, and is quickly outdated (e.g., after one or two years). Further, the specialized line card is typically configured to work with a specific type of network device, so it is not reusable by other network devices not of that specific type. Additionally, the network device has a finite number of slots available for line cards, and therefore utilizing the specialized line card limits a capability of the network device to include additional line cards, such as another network line card directed to carrying out the forwarding work.

Some implementations described herein include a server device that provides a NFV service line card for a network device. That is, the server device (e.g., utilizaing an x86 architecture) acts as a service line card for the network device (e.g., with or without physical network interface cards (NICs)) and provides one or more services for the network device (e.g., using one or more NFV technologies, such as a kernel-based virtual machine (KVM), a single root input/output virtualization (SR-IOV), virtualized service workloads run using docker, and/or the like). The server device is connected to the network device via respective ports of the network device and the server device, instead of being connected via a line card slot of the network device. Accordingly, any number of server devices (e.g., that respectively provide one or more NFV service line cards) may be connected to the network device to carry out computing work of the network device, without using physical line card slots of the network device. This enables the network device to utilize more of the physical line card slots for physical line cards (e.g., ASIC line cards) that are configured to carry out forwarding work of the network device. Accordingly, a forwarding capacity of the network device can be increased (e.g., to a slot capacity of the network device) and a service capacity of the network device can be increased (e.g., to a port capacity of the network device). The network device therefore has an improved performance for carrying out both forwarding work and computing work, as compared to a network device that does not utilize NFV service line cards provided by server devices. This minimizes wastage of computing resources of the network device, the server devices, and the physical line cards.

Further, a plurality of server devices that provide NFV service line cards may be included in a system, such as a network function virtualization (NFV) system, that is associated with the network device. Accordingly, the network device may be able to integrate data planes, management planes, and control planes of the network device and a plurality of services (e.g., running on the same or different server devices of a plurality of server devices). In this way, the plurality of server devices appear to the network device as part of the network device (e.g., as a plurality of NFV service line cards), which allows for unified control, management, and/or access of the plurality of server devices by the network device (and an administrator of the network device, such as via a user interface of the network device). For example, a management system (e.g., a network management system (NMS) that runs in a cloud environment) may be able to obtain management information related to the plurality of server devices from the network devices, and therefore does not need to directly log in to and/or communicate with the plurality of server devices in association with a management or configuration operation. In the same way, the network device acts as the single touch point for all operational and configuration commands, including for services running on the plurality of server devices. Further, the plurality of server devices can be configured to provide services for any type of network device, and can be reallocated to another network device when a need arises.

In this way, some implementations described herein facilitate elasticity of the network device. For example, some implementations facilitate "scale out" of the network device because any number of server devices may be used as NFV service line cards of the network device, each with more computing resources (e.g., processing resources, memory resources, communication resources, and/or power resources, among other examples) available than a typical specialized (non-ASIC) line card. Further, some implementations facilitate "scale up" of the network device because the plurality of server devices (e.g., that utilize an x86 architecture) can be modified at any time, such as to host more and/or different services, at any time, which is not available for some ASIC physical line cards.

FIGS. 1A-1H are diagrams of one or more example implementations 100 described herein. As shown in FIGS. 1A-1H, example implementation(s) 100 may include a network device, an NFV system, and a plurality of server devices (e.g., a plurality of server devices utilizing an x86 architecture; shown as network devices 1 through N, where N≥2). The network device, the NFV system, and the plurality of server devices are described in more detail below in connection with FIGS. 2-4.

The plurality of server devices may be associated with the NFV system. For example, as shown in FIG. 1A, the plurality of server devices may be included in the NFV system. In some implementations, the plurality of server devices may be associated with the computing hardware of the NFV system, as described elsewhere herein.

The network device may be connected to the NFV system, and, accordingly, may be connected to the plurality of server devices. The network device may be connected to each server device via one or more connections (e.g., one or more links). For example, as shown in FIG. 1A, the network device may be connected to the server device 1 via a first connection (shown as connection A) and a second connection (shown as connection B), may be connected to the server device 2 via a third connection (shown as connection C) and a fourth connection (shown as connection D), and so on. Each of the network device and the plurality of network devices may comprise a plurality of ports. A port, of a plurality of ports, of the network device may be connected to a corresponding port, of a plurality of ports, of a server device via a connection. For example, as shown in FIG. 1A, a first port of the network device may be connected to a first port of the server device 1 via the first connection (shown as connection A) and a second port of the network device may be connected to a second port of the server device via the second connection (show as connection B).

In some implementations, the network device may send, to a server device, of the plurality of server devices, traffic via one connection, of the connections between the network device and the server device, and may receive, from the server device, traffic via another connection of the connections between the network device and the server device. For example, the network device may send, to the server device 1, traffic via the first connection (shown as connection A), and may receive, from the server device 1, traffic via the second connection (shown as connection B). Accordingly, a port, of the plurality of ports, of the network device may be associated with sending traffic to a corresponding port, of another plurality of ports, of a server device via a connection, and another port, of the plurality of ports, of the network device may be associated with receiving traffic from a corresponding another port, of the other plurality of ports, of the server device via another connection. For example, the first port of the network device may be associated with sending traffic to a first port of the server device 1 via the first connection (shown as connection A), and the second port of the network device may be associated with receiving traffic from a second port of the server device via the second connection (shown as connection B).

In some implementations, each server device, of the plurality of server devices, may be configured as a NFV service line card of the network device that appears (e.g., from a management and forwarding perspective of the network device) as integrated with the network device. That is, each server device appears as an FPC, a PIC, and/or another type of service line card of the network device. Accordingly, each server device may provide a NFV service line card of the network device. For example, the network device, instead of communicating with a physical line card included in the network device, may communicate with a server device that is configured to be a NFV service line card of the network device. Accordingly, the network device may send, to a server device, first traffic associated with a NFV service line card that is provided by the server device via a connection between the network device and the server device, and may receive second traffic associated with the NFV service line card via another connection between the network device and the server device, as disclosed herein. In this way, the plurality of server devices may respectively provide a plurality of NFV service line cards of the network device.

Additionally, or alternatively, a server device, of the plurality of server devices, may be configured as multiple NFV service line cards of the network device that appear (e.g., from the management and forwarding perspective of the network device) as integrated with the network device. For example, a server device may provide a respective NFV service line card for each service hosted by the server device (e.g., the server device 1 shown in FIG. 1A may provide an individual NFC service line card for services A, B, and C). Accordingly, the network device may communicate with the multiple NFV service line cards of the server device via one or more connections between the network device and the server device (e.g., via the connections A and B for communicating with the NFV service line cards of the server device 1). In this way, the server device may respectively provide multiple NFV service line cards of the network device. Although some implementations described herein are directed to individual server devices respectively providing individual NFV service line cards, additional implementations include individual server devices each providing multiple NFV service line cards.

The network device may include a management module (e.g., a software management module) that is configured to manage and/or control the plurality of NFV service line cards (e.g., manage and/or control the plurality of server devices) and/or traffic that is communicated to and/or from the plurality of NFV service line cards (e.g., manage and/or control the traffic that is communicated to and/or from the plurality of server devices). Each server device may include an orchestrator (e.g., a software orchestration module) and may host one or more services of the NFV service line card provided by the server device. A service (also referred to as a workload) may include a virtualized service (or virtualized workload) (e.g., run using a KVM virtual machine, a VMware ESXi, or a similar virtualization resource), a containerized service (or containerized workload) (e.g., running inside a container provided by Docker, Podman, LXC, or a similar containerization resource), a bare-metal service (or bare-metal workload) (e.g., running directly on top of an operating system (OS) of the server device, such as a Linux OS), or another type of service. For example, as shown in FIG. 1A, the server device 1 may include an orchestrator and may host a service A, a service B, and a service C. The orchestrator may be configured to manage and/or control the one or more services. For example, the orchestrator of the server device 1 may be configured to manage and/or control the service A, the service B, and the service C. The one or more services may include a security service, such as an Internet protocol security (IPsec) service, a test agent (TA) service, and/or another security service; an address translation service, such as a network address translation (NAT) service; a diagnostic and/or health monitoring service; and/or another type of service.

Figure 1B:
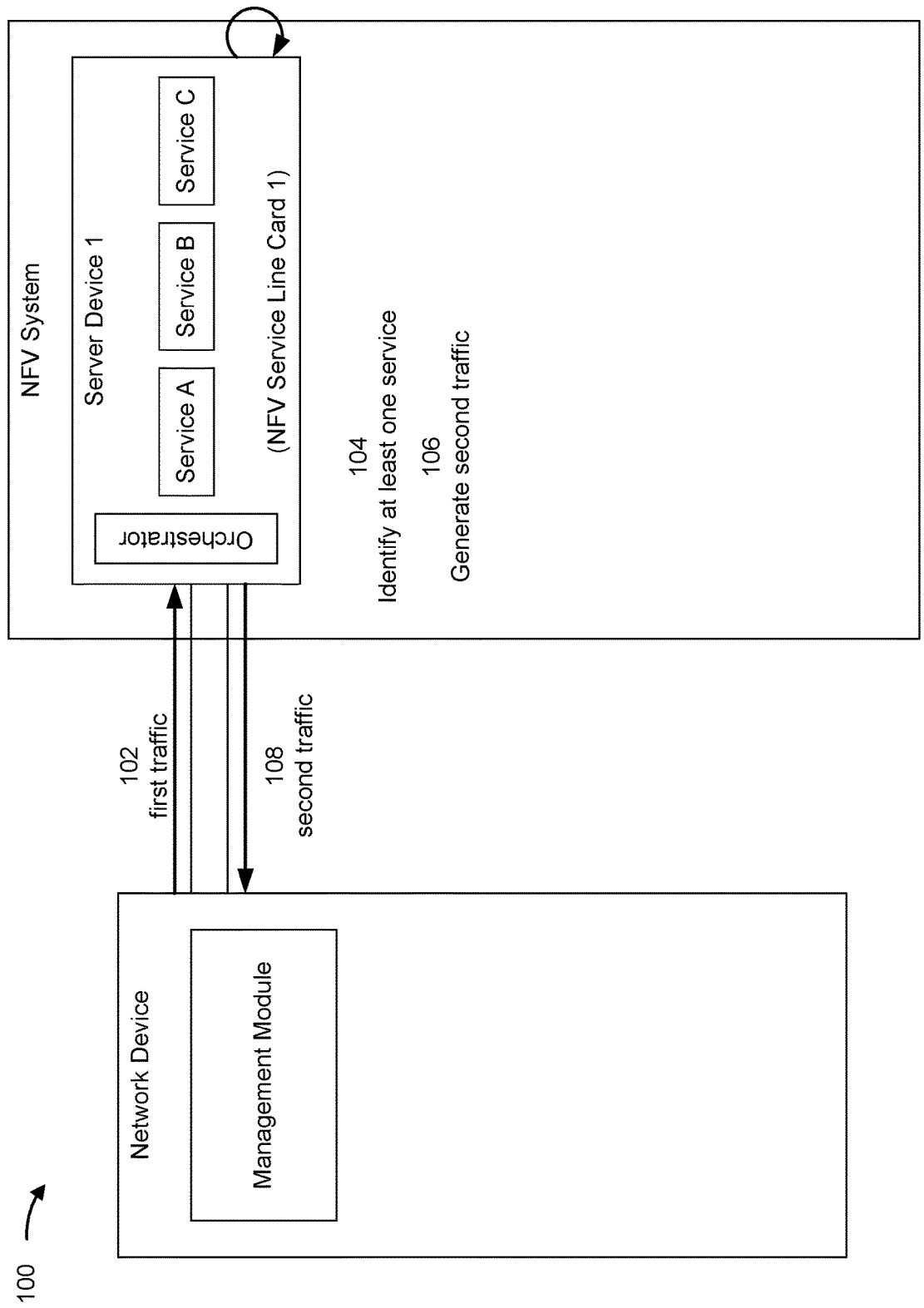

FIG. 1B shows how the network device and a server device (e.g., the server device 1), of the plurality of server devices, may communicate to allow the server device to provide a NFV service line card to the network device. Accordingly, as shown in FIG. 1B, and reference number 102, a network device (e.g., using the management module of the network device) may send first traffic associated with the NFV service line card to the server device (e.g., the server device 1). The network device may send the first traffic via a port of the network device to a port of the server device via a connection between the network device and the server device. The first traffic may be at least one of first management plane traffic associated with the NFV service line card, first control plane traffic associated with the NFV service line card, or first data plane traffic associated with the NFV service line card, as further described herein.

As shown by reference number 104, the server device (e.g., after receiving the first traffic) may process (e.g., using an orchestrator of the server device) the first traffic (e.g., parse and/or read the first traffic) to identify at least one service (e.g., of one or more services of the NFV service line card hosted by the server device) to apply to the first traffic, as further described herein. Accordingly, as shown by reference number 106, the server device may generate second traffic associated with the NFV service line card (e.g., based on applying the at least one service to the first traffic), as further described herein. As shown by reference number 108, the server device may send the second traffic via another port of the server device to another port of the network device via another connection between the network device and the server device. The second traffic may be at least one of second management plane traffic associated with the NFV service line card, second control plane traffic associated with the NFV service line card, or second data plane traffic associated with the NFV service line card, as further described herein. In this way, the network device may receive the second traffic from the server device.

Figure 1C:
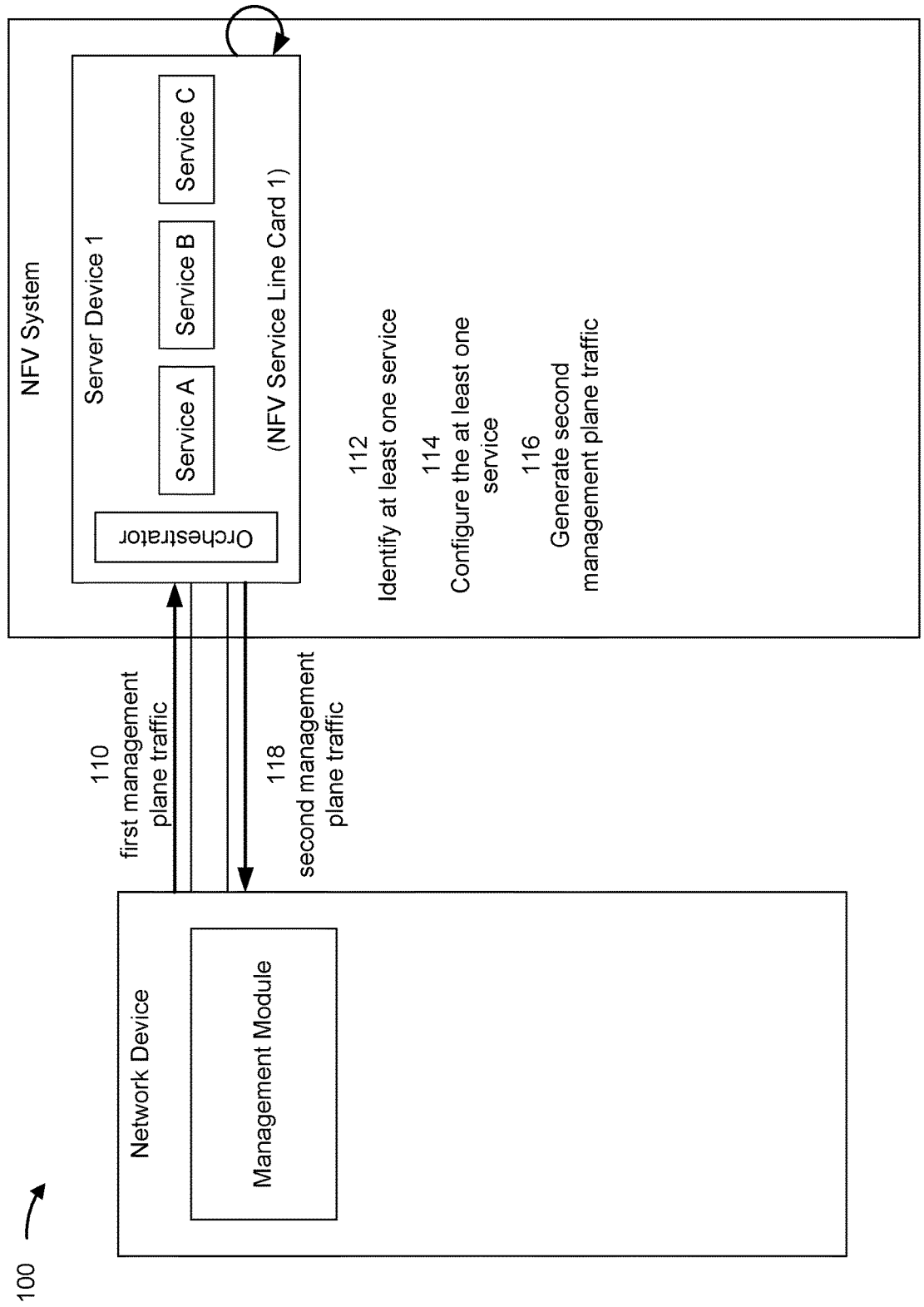

FIG. 1C shows the network device and a server device (e.g., the server device 1) communicating to allow the network device (e.g., using the management module of the network device) to manage a NFV service line card provided by the server device. As shown in FIG. 1C, and by reference number 110, the network device may send first management plane traffic to the server device. The first management plane traffic may include, for example, one or more request messages related to configuring (e.g., starting, stopping, restarting, updating, and/or modifying) at least one service of one or more services of the NFV service line card that are hosted by the server device.

As shown by reference number 112, the server device may process (e.g., using the orchestrator of the server device) the first management plane traffic (e.g., parse and/or read the first management plane traffic) to identify the at least one service of the NFV service line card hosted by the server device that is to be configured. Accordingly, as shown by reference number 114, the server device may configure the at least one service (e.g., based on information included in the one or more request messages of the first management plane traffic).

In some implementations, as shown by reference number 116, the server device may generate second management plane traffic associated with the NFV service line card (e.g., based on configuring the at least one service). The second management plane traffic may include one or more response messages related to configuring the at least one service (e.g., one or more configuration acknowledgment messages). As shown by reference number 118, the server device may send the second management plane traffic to the network device. In this way, the network device may receive the second management plane traffic from the server device (e.g., from the NFV service line card provided by the server device). The network device may determine whether configuration of the at least one service was successful based on the second management plane traffic (e.g., based on the one or more configuration acknowledgment messages).

Figure 1D:
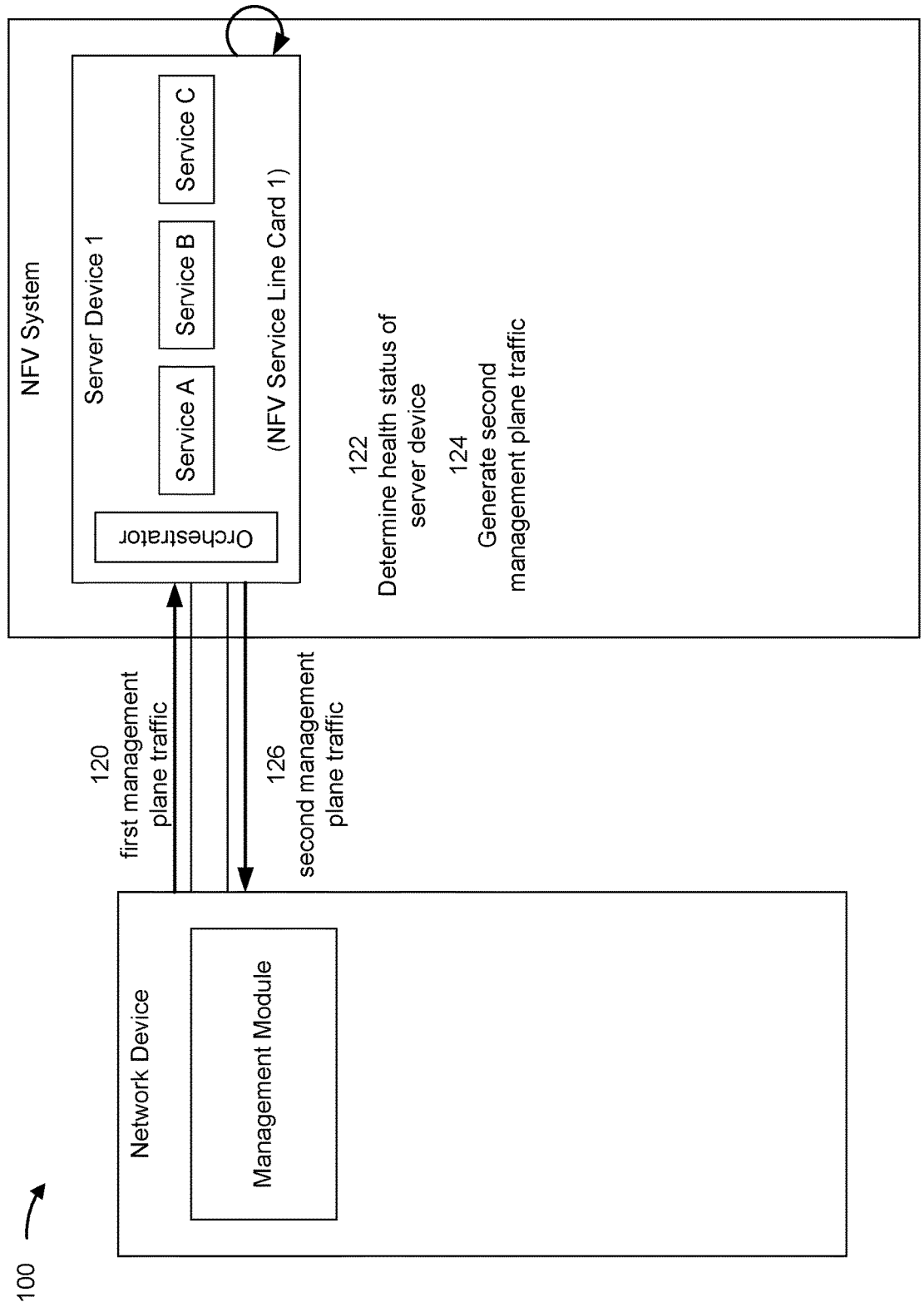

FIG. 1D shows the network device and a server device (e.g., the server device 1) communicating to allow the network device (e.g., using the management module of the network device) to monitor a NFV service line card provided by the server device. As shown in FIG. 1D, and by reference number 120, the network device may send first management plane traffic to the server device. The first management plane traffic may include, for example, one or more request messages related to a health status of the server device (e.g., one or more messages related to a health status of the NFV service line card provided by the server device).

The server device may process (e.g., using the orchestrator of the server device) the first management plane traffic (e.g., parse and/or read the first management plane traffic) to identify at least one health parameter of the server device (e.g., at least one health parameter of the NFV service line card provided by the server device) that is to be determined, such as an operating temperature of the server device, a utilization rate associated with one or more processors of the server device, a utilization rate associated with one or more memories associated with the server device, and/or other health information associated with the server device. Accordingly, as shown by reference number 122, the server device may determine the health status of the server device (e.g., by determining the at least one health parameter, such as by reading a sensor associated with the server device).

In some implementations, as shown by reference number 124, the server device may generate second management plane traffic associated with the NFV service line card (e.g., based on determining the health status of the server device). The second management plane traffic may include one or more response messages related to the health status of the server device (e.g., one or more messages indicating the health status of the server device). As shown by reference number 126, the server device may send the second management plane traffic to the network device. In this way, the network device may receive the second management plane traffic from the server device (e.g., from the NFV service line card provided by the server device). The network device may determine the health status of the server device, which the network device may use when determining whether to send other traffic to the server device (e.g., the NFV service line card provided by the server device), as further described herein.

Figure 1E:
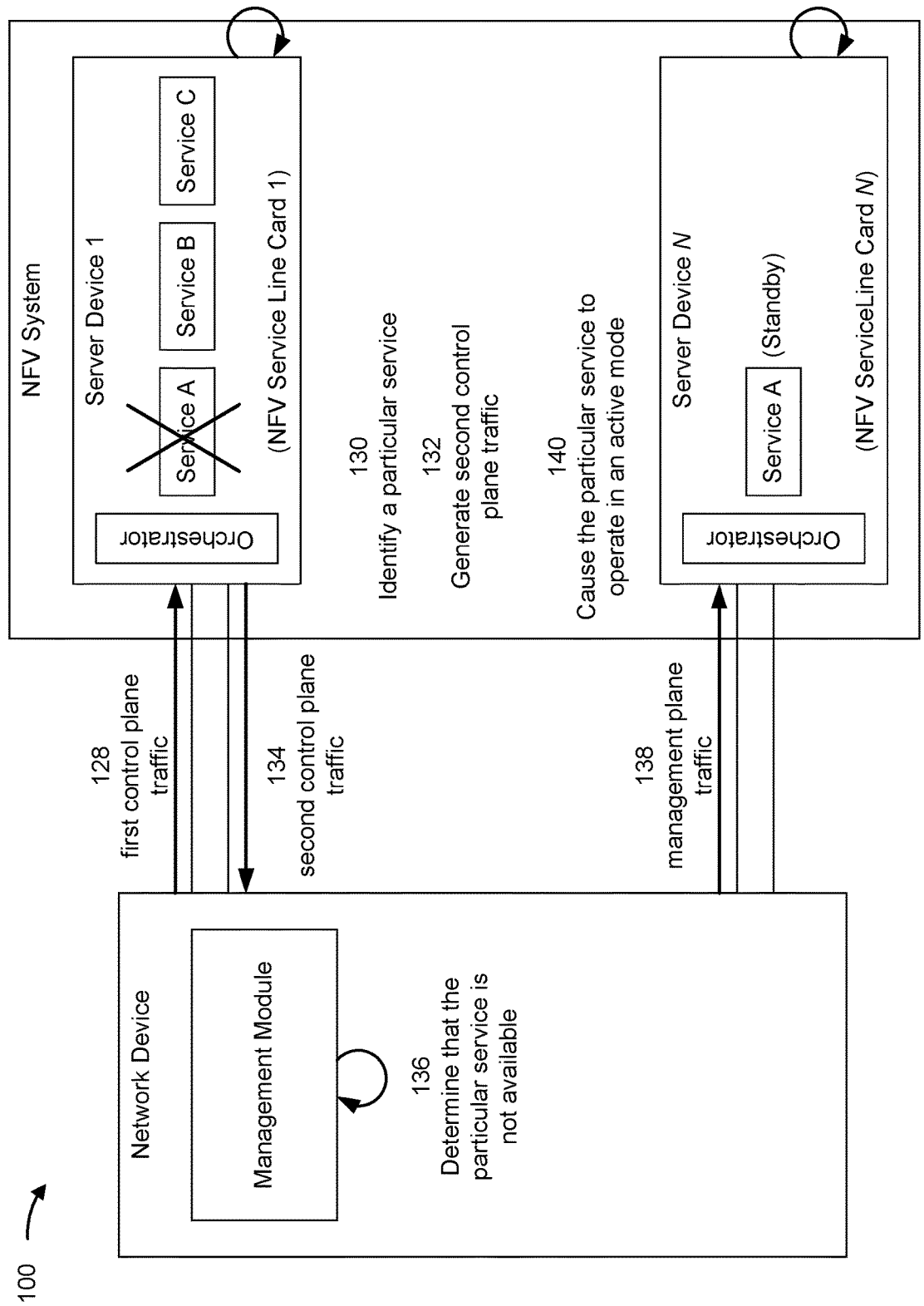

FIG. 1E shows the network device and two server devices (shown as the server device 1 and the server device N), of the plurality of server devices, communicating to allow the network device (e.g., using the management module of the network device) to control the respective NFV service line cards provided by the two server devices. As further shown in FIG. 1E, a server device (e.g., the server device 1) may host one or more services of a NFV service line card, including a particular service (e.g., that is operating in an active mode, shown as the service A). Another server device (e.g., the server device N) may host one or more services of another NFV service line card, including a copy of the particular service (e.g., that is operating in a standby mode, shown as the service A). As shown by reference number 128, the network device may send first control plane traffic to the server device. The first control plane traffic may include, for example, one or more first liveness messages associated with the particular service (e.g., one or more keepalive messages that are associated with a bidirectional forwarding detection (BFD) traffic protocol, an Internet control message protocol (ICMP), or another protocol, that originate from the network device that are destined for the particular service, which are intended to indicate to the particular service that the network device is operating).

As shown by reference number 130, the server device may process (e.g., using an orchestrator of the server device) the first control plane traffic (e.g., parse and/or read the first control plane traffic) to identify the particular service (e.g., determine that the one or more keepalive messages are destined for the particular service). Accordingly, as shown by reference number 132, the server device (e.g., using the particular service based on identifying the particular service) may generate second control plane traffic. The second control plane traffic may include one or more second liveness messages associated with the particular service (e.g., one or more keepalive messages originating from the particular service that are destined for the network device service, which are intended to indicate to the network device that the particular service is operating). As shown by reference number 134, the server device may send the second control plane traffic to the network device. In this way, the network device may receive the second control plane traffic from the server device (e.g., from the NFV service line card provided by the server device). Accordingly, the network device may thereby determine that the particular process is operating in an active mode on the NFV service line card provided by the server device (e.g., may determine that the particular process is "alive" on the NFV service line card provided by the server device).

Alternatively, when the particular service is not operating, or is no longer operating, in an active mode on the NFV service line card provided by the server device, the second control plane traffic may not include a second liveness message associated with the particular service, or, the server device may not generate and send any second control plane traffic (e.g., because the server device cannot use the particular process to generate the second control plane traffic). Accordingly, as shown by reference number 136, the network device may determine (e.g., based on the second control plane traffic that does not include second liveness messages associated with the particular service or based on not receiving any second control plane traffic) that the particular service is not available (e.g., that the particular process is not operating in an active mode on the NFV service line card provided by the server device). As shown by reference number 138, the network device may send management plane traffic associated with the other NFV service line card to the other server device (e.g., using a port of the network device that is connected to a corresponding port of the other server device via a connection between the network device and the other server device). The management plane traffic may include one or more request messages related to causing the copy of the particular service (e.g., that is operating in a standby mode) to operate in an active mode on the other NFV service line card provided by the other server device. Accordingly, as shown by reference number 140, the other server device may configure the copy of the particular service to operate in an active mode (e.g., based on the management plane traffic). In this way, the network device may control the other NFV service line card to provide the particular service for the network device, thereby improving a performance of the network device as compared to a network device that does not utilize a standby copy of the particular process.

Figure 1F:
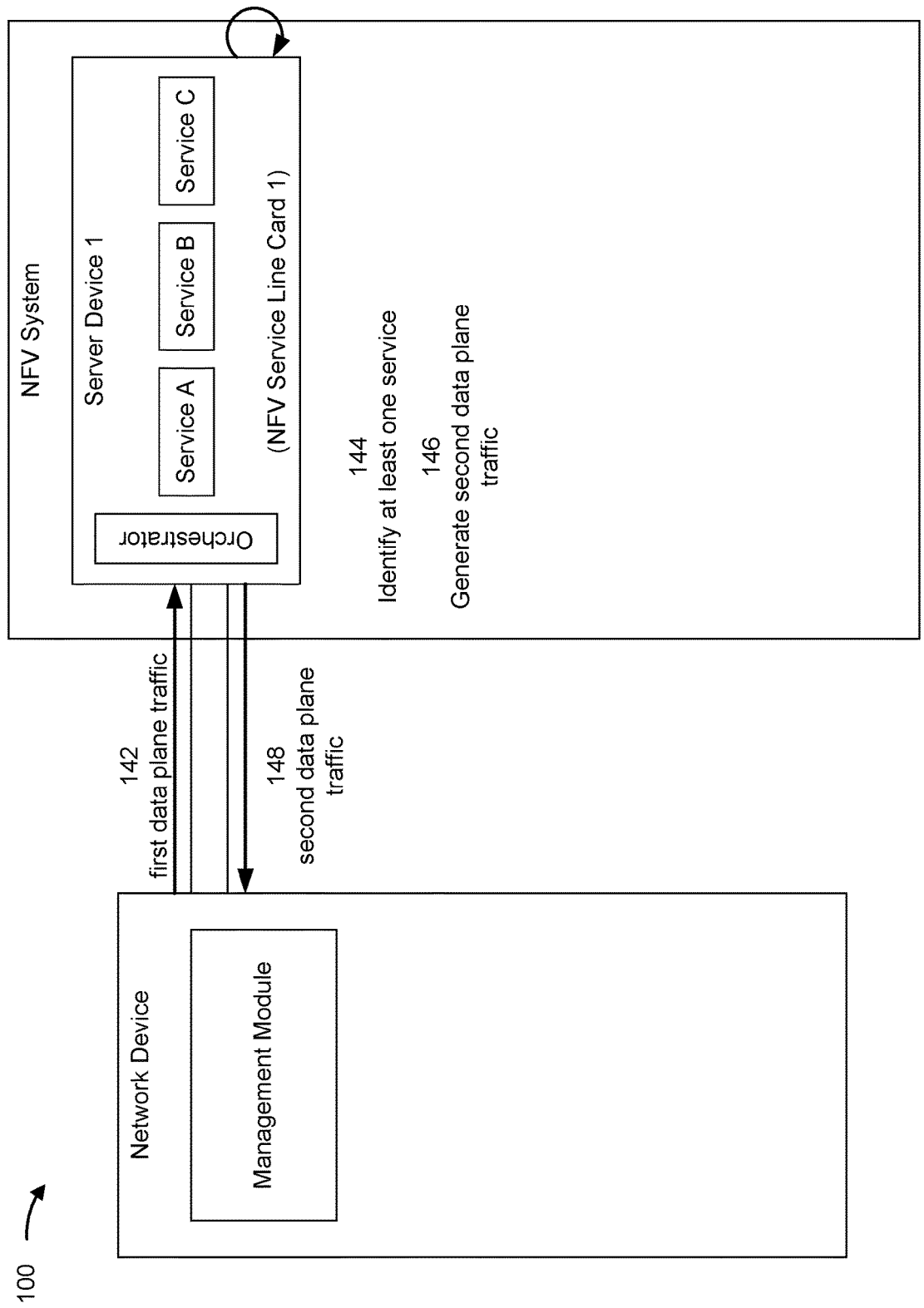

FIG. 1F shows the network device and a server device communicating to allow the NFV service line card provided by the server device network device to apply at least one service to data plane traffic (e.g., before the network device forwards the data plane traffic). As shown in FIG. 1F, and by reference number 142, the network device may send first data plane traffic to the server device. The first data plane traffic may include, for example, one or more data messages (e.g., that are to be forwarded by the network device).

As shown by reference number 144, the server device (e.g., after receiving the first data plane traffic) may process the first data plane traffic (e.g., parse and/or read the first data plane traffic) to identify at least one service of the NFV service line card hosted by the server device that is to be applied to the first data plane traffic. For example, the server device may determine one or more characteristics of the first data plane traffic and may determine (e.g., based on the one or more characteristics, such as searching a lookup table based on the one or more characteristics) that the at least one service is to be applied to the first data plane traffic. Accordingly, the server device may apply the at least one service to the first data plane traffic.

As shown by reference number 146, the server device may generate second data plane traffic associated with the NFV service line card (e.g., based on applying the at least one service to the first data plane traffic). The second data plane traffic may include at least some of the one or more data messages that were included in the first data plane traffic, one or more data messages that are modifications of at least some of the one or more data messages that were included in the first data plane traffic, and/or one or more data messages that were not included in, and are not modifications of, the one or more data messages included in the first data plane traffic. As shown by reference number 148, the server device may send the second data plane traffic to the network device. In this way, the network device may receive the second data plane traffic from the server device (e.g., from the NFV service line card provided by the server device). The network device then may forward the second data plane traffic (e.g., based on destination information included in the second data plane traffic).

Figure 1G:
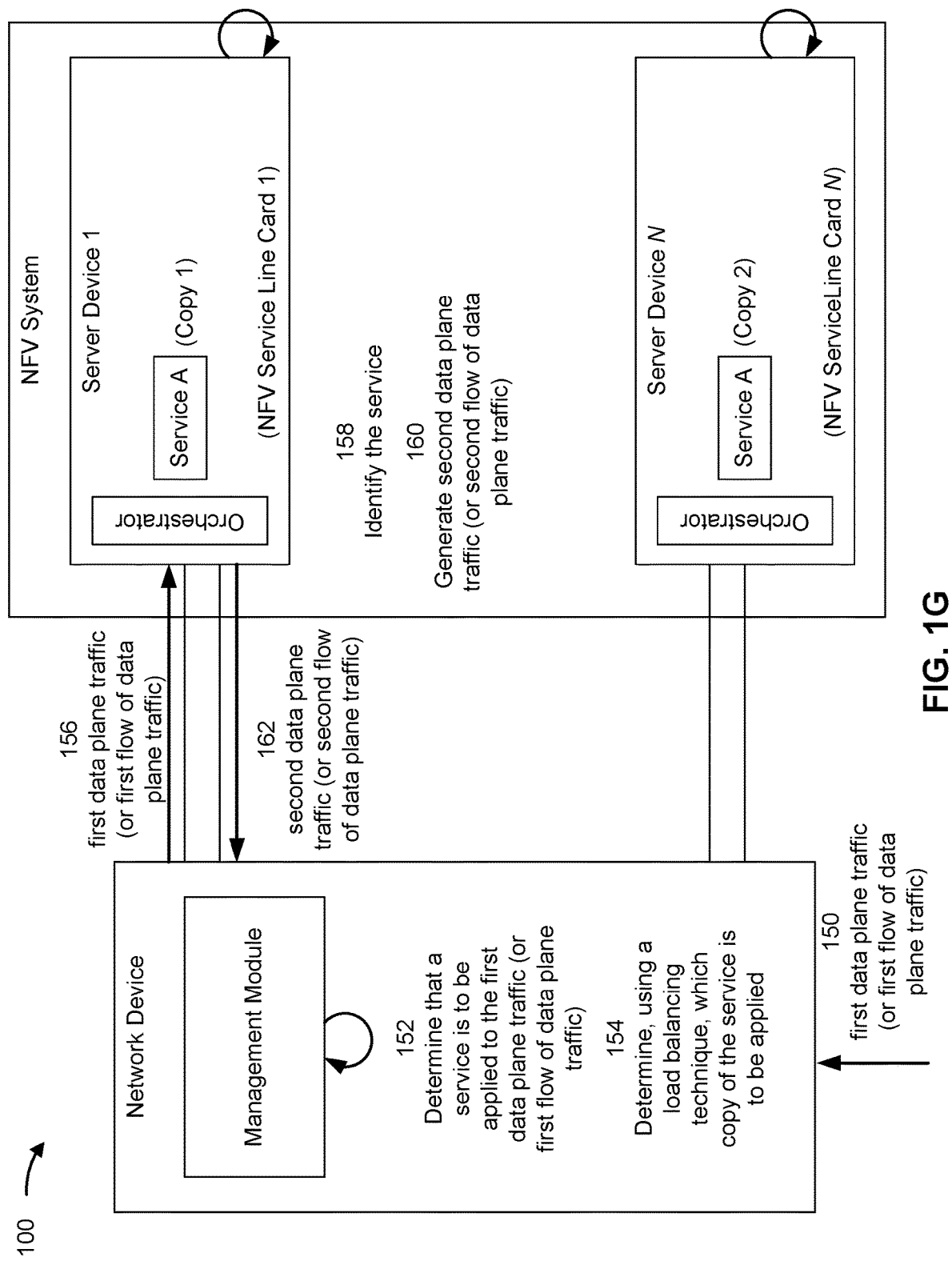

FIG. 1G shows the network device using a load balancing technique to determine which copy of a service (e.g. which instance of a service), that is respectively provided by at least two NFV service line cards, to apply to data plane traffic (e.g., before the network device forwards the data plane traffic). As further shown in FIG. 1G, a server device (e.g., the server device 1) may host one or more services of a NFV service line card, including a first copy of a service (e.g., that is operating in an active mode, shown as the service A). Another server device (e.g., the server device N) may host one or more services of another NFV service line card, including a second copy of the particular service (e.g., that is operating in an active mode, shown as the service A). As shown by reference number 150, the network device may receive first data plane traffic (e.g., via a wide area network (WAN) port, or another port, of the network device). The first data plane traffic may include, for example, one or more data messages (e.g., that are to be forwarded by the network device). In some implementations, the first data plane traffic may be a flow of data plane traffic (also referred to as a first flow of data plane traffic).

As shown by reference number 152, the network device may determine (e.g., using the management module of the network device) that a service (e.g., a security service or another service) is to be applied to the first data plane traffic (or the first flow of data plane traffic). As shown by reference number 154, the network device may determine (e.g., based on determining that the service is to be applied to the first data plane traffic) that a particular copy of the service is to be applied to the first data plane traffic (or the first flow of data plane traffic). For example, the network device may use a load balancing technique (e.g., an equal cost multipath (ECNIP) load balancing technique and/or another load balancing technique) to determine that the first copy of the service (e.g., of the NFV service line card that is provided by the server device 1) is to be applied to the first data plane traffic (or the first flow of data plane traffic). Accordingly, as shown by reference number 156, the network device may send the first data plane traffic (or the first flow of data plane traffic) to the server device.

As shown by reference number 158, the server device (e.g., after receiving the first data plane traffic or the first flow of data plane traffic) may process the first data plane traffic (or the first flow of data plane traffic) (e.g., parse and/or read the first data plane traffic or the first flow of data plane traffic) to identify the first copy of the service of the NFV service line card hosted by the server device that is to be applied to the first data plane traffic (or the first flow of data plane traffic) (e.g., in a similar manner as that described herein in relation to FIG. 1F and reference number 144). Accordingly, the server device may apply the first copy of the service to the first data plane traffic (or the first flow of data plane traffic).

As shown by reference number 160, the server device may generate second data plane traffic (or a second flow of data plane traffic) associated with the NFV service line card (e.g., based on applying the first copy of the service to the first data plane traffic or the first flow of data plane traffic). The second data plane traffic (or the second flow of data plane traffic) may include at least some of the one or more data messages that were included in the first data plane traffic (or the first flow of data plane traffic), one or more data messages that are modifications of at least some of the one or more data messages that were included in the first data plane traffic (or the first flow of data plane traffic), and/or one or more data messages that were not included in, and are not modifications of, the one or more data messages included in the first data plane traffic (or the first flow of data plane traffic). As shown by reference number 162, the server device may send the second data plane traffic (or the second flow of data plane traffic) to the network device. In this way, the network device may receive the second data plane traffic (or the second flow of data plane traffic) from the server device (e.g., from the NFV service line card provided by the server device). The network device then may forward the second data plane traffic (or the second flow of data plane traffic) (e.g., based on destination information included in the second data plane traffic or the second flow of data plane traffic)).

Figure 1H:
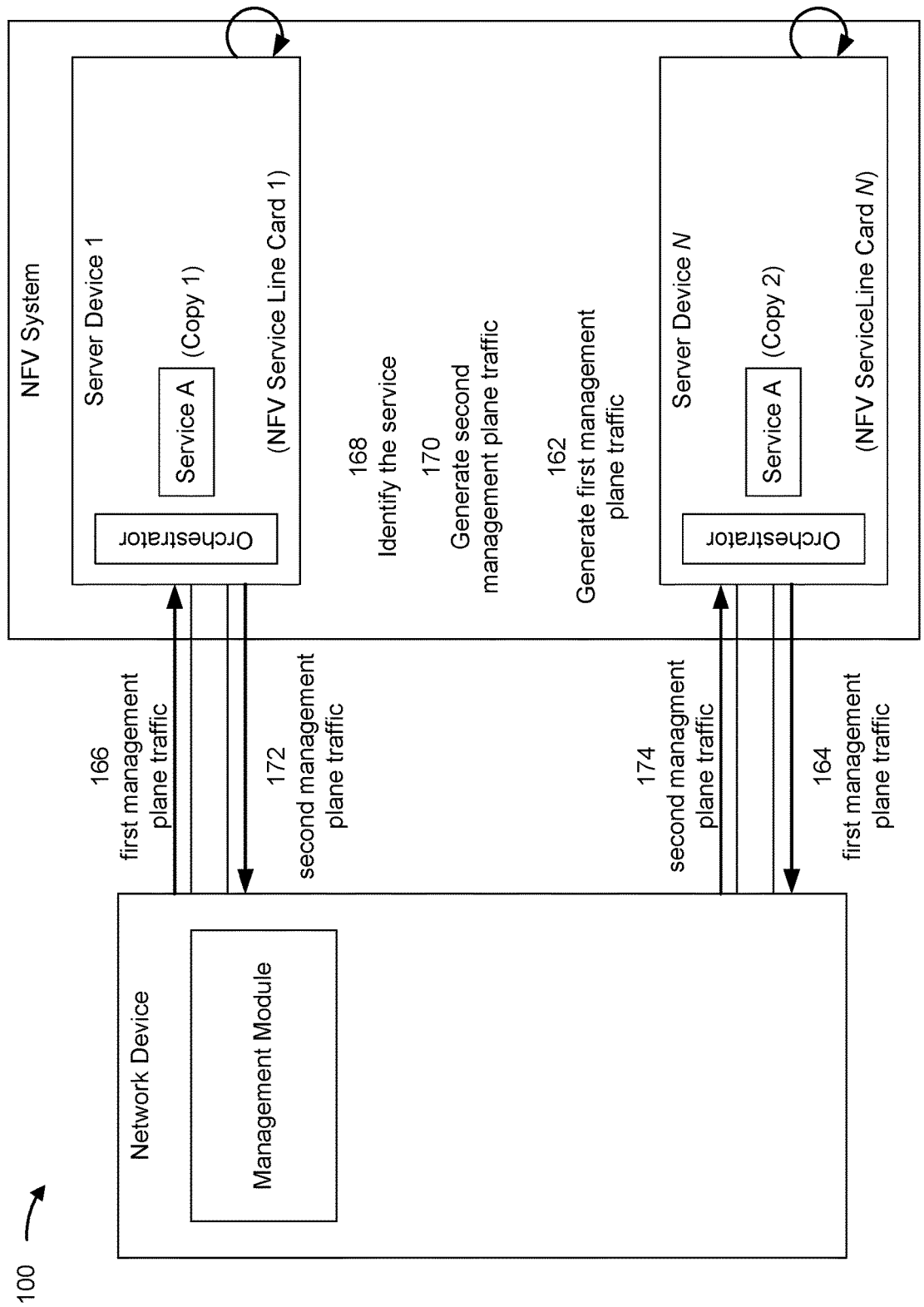

FIG. 1H shows copies of a service (e.g., a stateful service), that are respectively provided by at least two NFV service line cards, communicating with each other via the network device (e.g., to ensure high availability of the stateful service). As further shown in FIG. 1H, a server device (e.g., the server device 1) may host one or more services of a NFV service line card, including a first copy of a service (e.g., a stateful service that is operating in an active mode, shown as the service A). Another server device (e.g., the server device N) may host one or more services of another NFV service line card, including a second copy of the service (e.g., that is operating in an active mode, shown as the service A). As shown by reference number 162, the other server device (e.g., using the second copy of the process) may generate first management plane traffic associated with the other NFV service line card. The first management plane traffic may include one or more state update messages related to a state of the second copy of the service of the other NFV service line card (e.g., related to information stored by the other server device regarding the state of the second copy of the process). As shown by reference number 164, the other server device may send the first management plane traffic to the network device.

As shown by reference number 166, the network device may send the first management plane traffic to the server device (e.g., to provide the first management plane traffic to the first copy of the service of the NFV service line card hosted by the server device). As shown by reference number

168, the server device may process the first management plane traffic (e.g., parse and/or read the first management plane traffic) to identify the first copy of the service (e.g., as the intended recipient of the first management plane traffic). As shown by reference number 170, the server device may generate (e.g., using the first copy of the process and/or in response to the first management plane traffic) second management plane traffic associated with the NFV service line card. The second management plane traffic may include one or more state update messages related to a state of the first copy of the service of the NFV service line card (e.g., related to information stored by the server device regarding the state of the first copy of the process).

As shown by reference number 172, the other server device may send the second management plane traffic to the network device. As shown by reference number 174, the network device may send the second management plane traffic to the other server device (e.g., to provide the second management plane traffic to the second copy of the service of the other NFV service line card hosted by the other server device).

In this way, the first copy of the process (e.g., the stateful process) of the NFV service line card hosted by the server device and the second copy of the process of the other NFV service line card hosted by the other server device may exchange state information. In some implementations, one copy of the process may be a backup copy of the process (e.g., that is operating in a standby mode) for a primary copy of the process (e.g., that is operating in an active mode). Accordingly, if the primary copy should fail, or otherwise not operate in an active mode, the network device can utilize the backup copy of the process (e.g., cause the backup copy of the process to operate in an active mode). This allows the network device to provide an improved performance (e.g., as compared to a network device that does not utilize a backup process functionality). Further, because the backup copy already has current state information of the primary copy of the process, the switchover to the backup process enables high availability of the network device, which further improves the performance of the network device (e.g., because there is little downtime related to switching from the primary copy of the process to the backup copy of the process).

In some implementations, a server device may host one or more services of a NFV service line card. A management system (e.g., an NMS that runs in a cloud environment) may communicate with the server device, such as in association with performing one or more management or configuration operations associated with the one or more services of the NFV service line card. The management system may communicate with the server device (e.g., with the one or more services of the NFC service line card) via the network device (e.g., via one or more connections between the network device and the server device). Alternatively, the management system may directly communicate with the server device (e.g., with the one or more services of the NFC service line), such as via one or more connection between the server device and the management system. In this way, the management system has more than one way to communicate with the server device and/or the one or more services of the NFC service line card provided by the server device. This improves a performance and/or efficiency of the server device and/or the one or more services of the NFC service line card in association with performance of the one or more management or configuration operations.

As indicated above, FIGS. 1A-1H are provided merely as one or more examples. Other examples may differ from what is described with regard to FIGS. 1A-1H. The number and arrangement of devices shown in FIGS. 1A-1H are provided as one or more examples. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) of FIGS. 1A-1H may perform one or more functions described as being performed by another set of devices of FIGS. 1A-1H.

Figure 2:
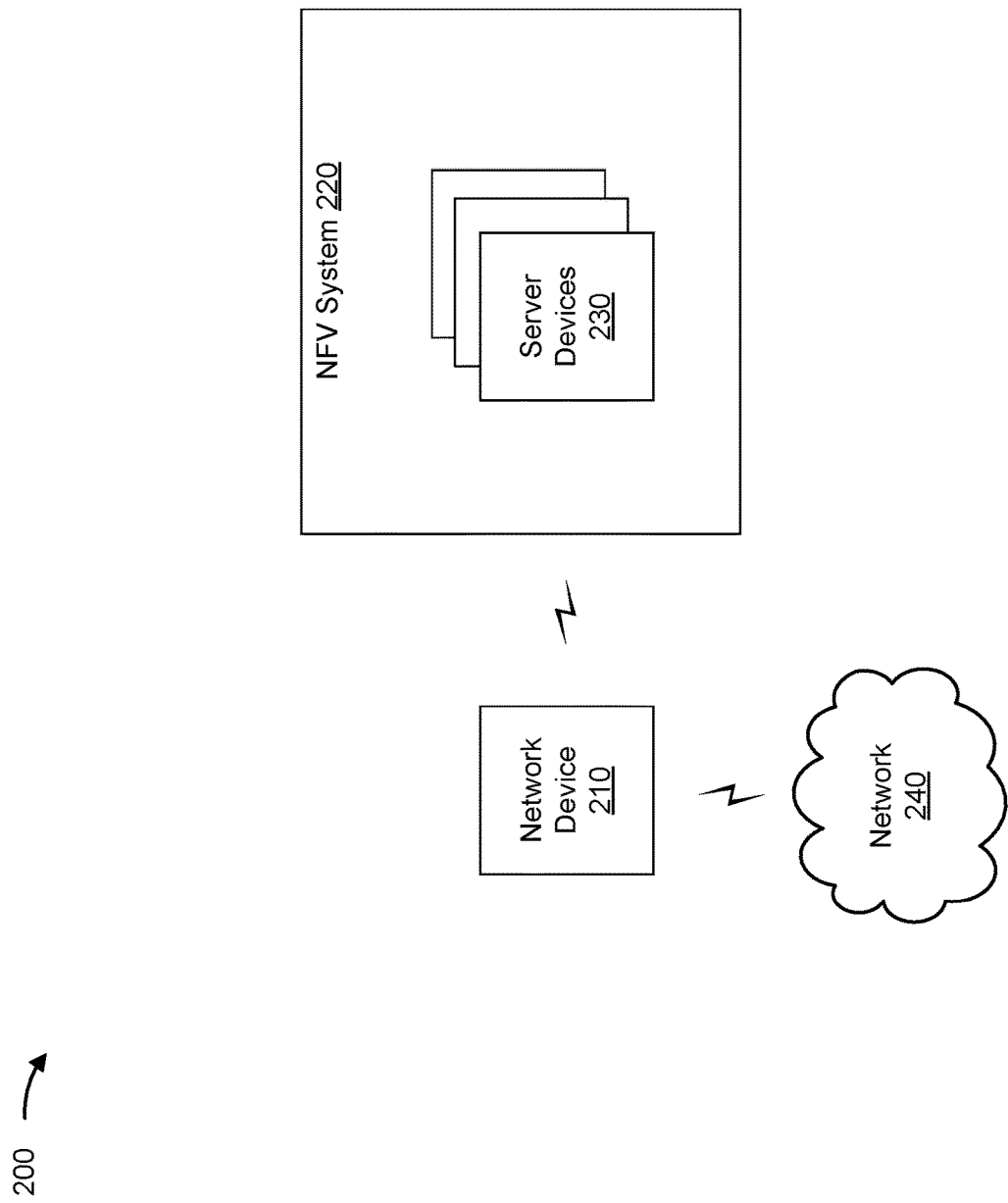
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a network device 210, an NFV system 220, a plurality of server devices 230, and a network 240. Devices and/or elements of environment 200 may interconnect via wired connections and/or wireless connections.

The network device 210 may include one or more devices capable of receiving, processing, storing, routing, and/or providing traffic (e.g., a packet and/or other information or metadata) in a manner described herein. For example, the network device 210 may include a router, such as a label switching router (LSR), a label edge router (LER), an ingress router, an egress router, a provider router (e.g., a provider edge router or a provider core router), a virtual router, or another type of router. Additionally, or alternatively, the network device 210 may include a gateway, a switch, a firewall, a hub, a bridge, a reverse proxy, a server (e.g., a proxy server, a cloud server, or a data center server), a load balancer, and/or a similar device. In some implementations, the network device 210 may be a physical device implemented within a housing, such as a chassis. In some implementations, the network device 210 may be a virtual device implemented by one or more computing devices of a cloud computing environment or a data center. In some implementations, a group of network devices 210 may be a group of data center nodes that are used to route traffic flow through a network. The network device 210 may include a plurality of ports (e.g., a plurality of ports that each support data speeds greater than or equal to 100 Gigabits per second (Gbps), 200 Gbps, 400 Gbps, 600 Gbps, 800 Gbps, and/or 1000 Gbps).

The NFV system 220 may include a platform or environment that virtualizes classes of network node functions into building blocks that may connect, or chain together, to create services, such as a security service, a traffic analytics service, a caching service, and/or a transcoding service. The NFV system 220 may include one or more virtualized network functions (VNFs), which include virtual machines (VMs) and/or Linux containers. The NFV system 220 may include a communication device and/or a computing device. For example, the NFV system 220 may include a server, such as an edge compute server, an application server, a client server, a web server, a database server, a host server, a proxy server, a virtual server (e.g., executing on computing hardware), or a server in a cloud computing system. In some implementations, the NFV system 220 includes computing hardware used in a cloud computing environment, such as the plurality of server device 230.

The server device(s) 230 may include one or more devices capable of receiving, generating, storing, processing, providing, and/or routing traffic (e.g., as a NFV service line card of the network device 210), as described elsewhere herein. The server device 230 may include a communication device and/or a computing device. For example, the server device 230 may include a server, such as an application server, a client server, a web server, a database server, a host server, a proxy server, a virtual server (e.g., executing on computing hardware), or a server in a cloud computing system. In some implementations, the server device 230 may include computing hardware used in a cloud computing environment.

The network 240 includes one or more wired and/or wireless networks. For example, the network 240 may include a cellular network, a public land mobile network (PLMN), a local area network (LAN), a wide area network (WAN), a private network, the Internet, and/or a combination of these or other types of networks. The network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
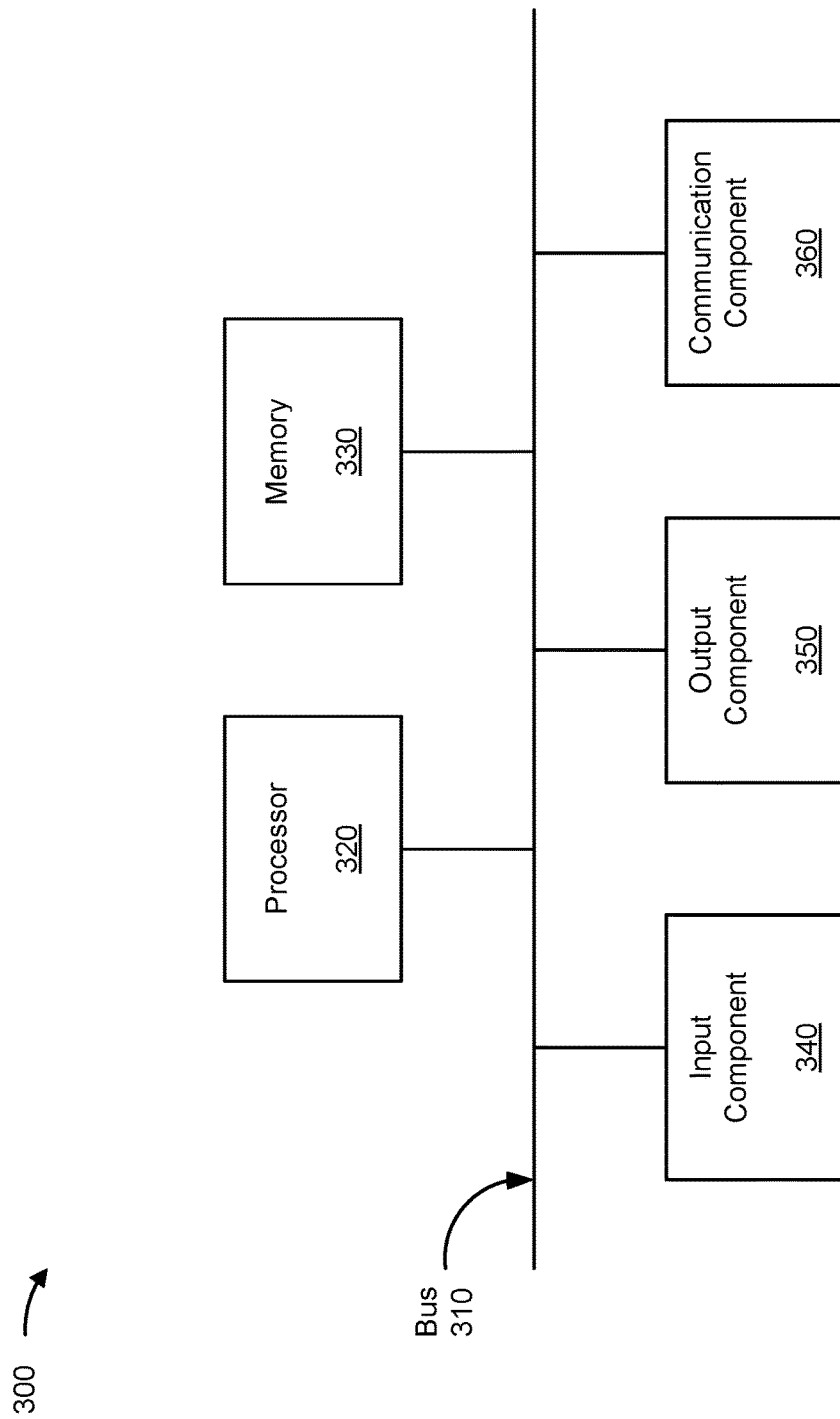
FIG. 3 is a diagram of example components of a device associated with facilitating elasticity of a network device.

FIG. 3 is a diagram of example components of a device 300 associated with facilitating elasticity of a network device. Device 300 may correspond to the network device 210, the NFV system 220, and/or the server device 230. In some implementations, the network device 210, the NFV system 220, and/or the server device 230 may include one or more devices 300 and/or one or more components of device 300. As shown in FIG. 3, device 300 may include a bus 310, a processor 320, a memory 330, an input component 340, an output component 350, and a communication component 360.

Bus 310 may include one or more components that enable wired and/or wireless communication among the components of device 300. Bus 310 may couple together two or more components of FIG. 3, such as via operative coupling, communicative coupling, electronic coupling, and/or electric coupling. Processor 320 may include a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 may include one or more processors capable of being programmed to perform one or more operations or processes described elsewhere herein.

Memory 330 may include volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 may include one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
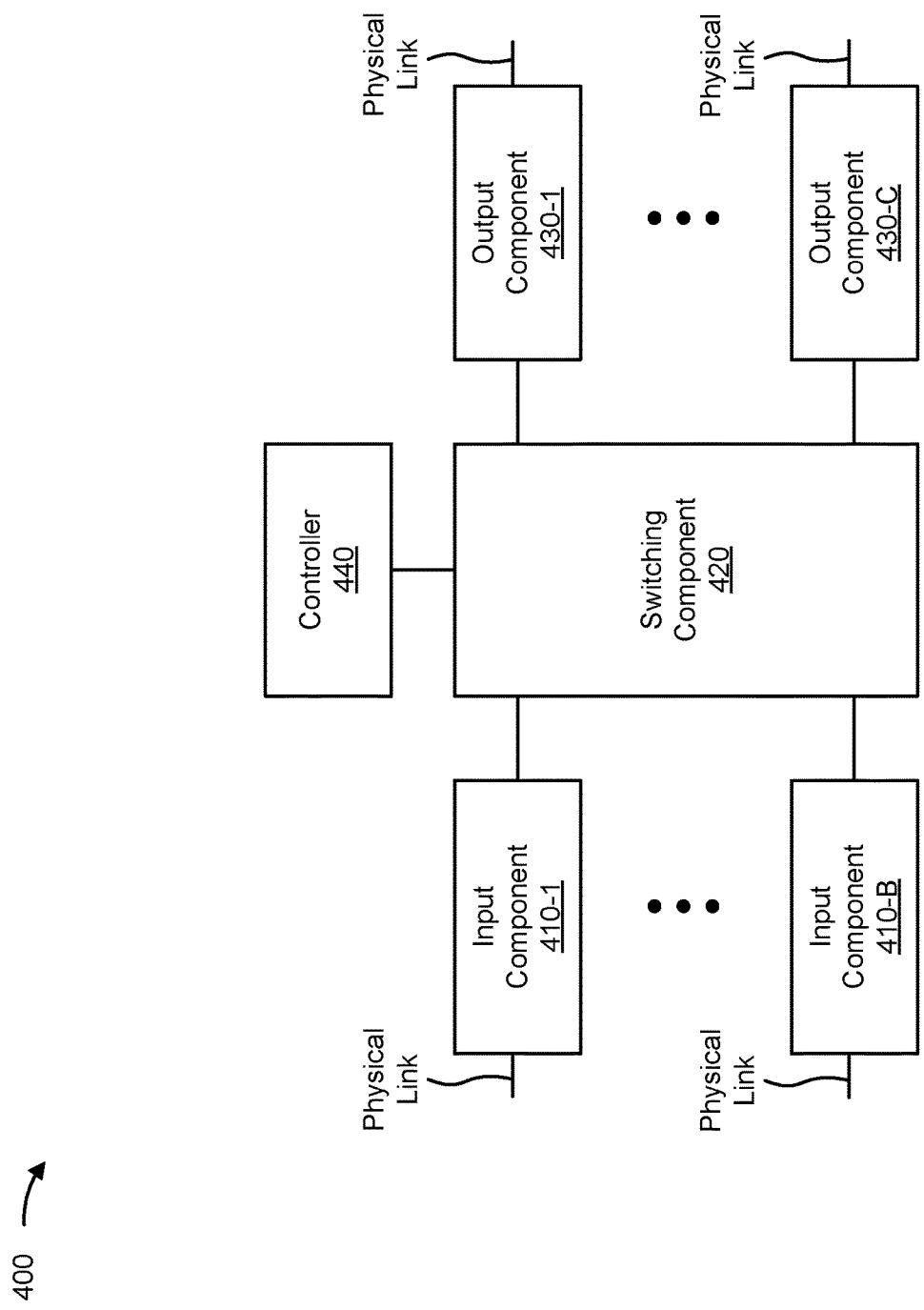
FIG. 4 is a diagram of example components of a device associated with facilitating elasticity of a network device.

FIG. 4 is a diagram of example components of a device 400 associated with facilitating elasticity of a network device. Device 400 may correspond to the network device 210, the NFV system 220, and/or the server device 230. In some implementations, the network device 210, the NFV system 220, and/or the server device 230 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
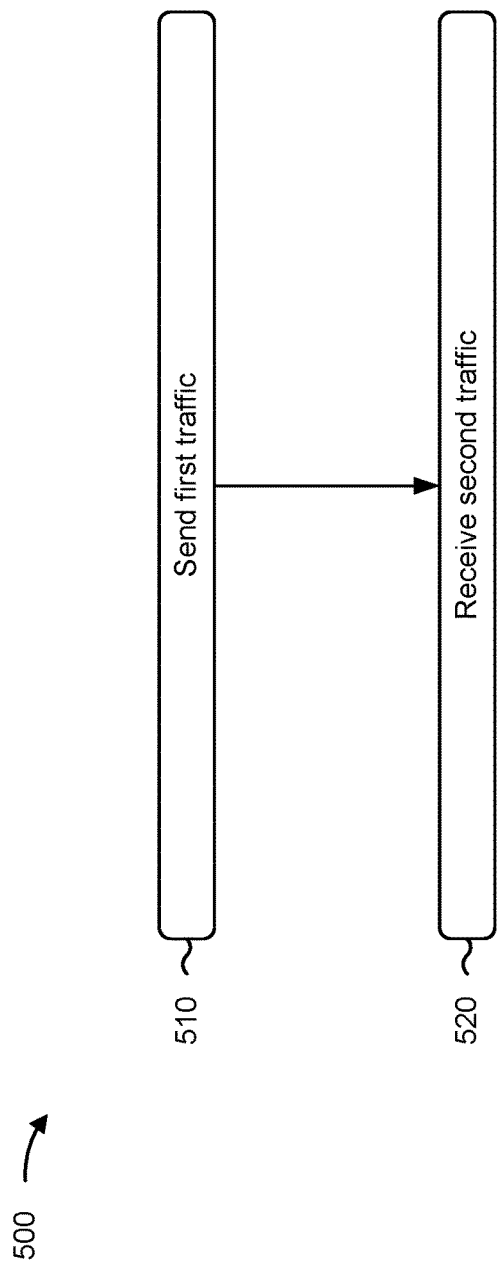
FIGS. 5-6 are flowcharts of example processes associated with facilitating elasticity of a network device.

FIG. 5 is a flowchart of an example process 500 associated with facilitating elasticity of a network device. In some implementations, one or more process blocks of FIG. 5 are performed by a network device (e.g., the network device 210). In some implementations, one or more process blocks of FIG. 5 are performed by another device or a group of devices separate from or including the network device, such as an NFV system (e.g., the NFV system 220) and/or a server device (e.g., the server device 230). Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output component 430, and/or controller 440; and/or one or more other components.

As shown in FIG. 5, process 500 may include sending first traffic (block 510). For example, the network device may send first traffic, as described above. In some implementations, the network device may send, via a first port of the network device and to a server device, the first traffic. In some implementations, the server device provides a NFV service line card of the network device. In some implementations, the first traffic is at least one of first management plane traffic associated with the NFV service line card, first control plane traffic associated with the NFV service line card, or first data plane traffic associated with the NFV service line card.

As further shown in FIG. 5, process 500 may include receiving second traffic (block 520). For example, the network device may receive second traffic, as described above. In some implementations, the network device may receive, via a second port of the network device and from the server device, the second traffic. In some implementations, the second traffic is at least one of second management plane traffic associated with the NFV service line card, second control plane traffic associated with the NFV service line card, or second data plane traffic associated with the NFV service line card.

Process 500 may include additional implementations, such as any single implementation or any combination of implementations described below and/or in connection with one or more other processes described elsewhere herein.

In a first implementation, the server device is associated with an NFV system.

In a second implementation, alone or in combination with the first implementation, the server device hosts one or more services of the NFV service line card; the first traffic is the first management plane traffic and includes one or more request messages related to configuring at least one service, of the one or more services, of the NFV service line card; and the second traffic is the second management plane traffic and includes one or more response messages related to configuring the at least one service.

In a third implementation, alone or in combination with one or more of the first and second implementations, the first traffic is the first management plane traffic and includes one or more request messages related to a health status of the server device, and the second traffic is the second management plane traffic and includes one or more response messages related to the health status of the server device.

In a fourth implementation, alone or in combination with one or more of the first through third implementations, the server device hosts one or more services of the NFV service line card; the first traffic is the first control plane traffic and includes one or more first liveness messages associated with a particular service, of the one or more services, of the NFV service line card; and the second traffic is the second control plane traffic and includes one or more second liveness messages associated with the particular service.

In a fifth implementation, alone or in combination with one or more of the first through fourth implementations, process 500 includes determining, based on the second traffic, that the particular service is not available via the NFV service line card provided by the server device; and sending, via a third port of the network device and to another server device, third traffic, wherein the other server device provides another NFV service line card of the network device and the other server device hosts one or more services of the other NFV service line card, wherein the one or more services of the other NFV service line card include a copy of the particular service, which is operating in a standby mode, and wherein the third traffic is third management plane traffic associated with the other NFV service line card and includes one or more request messages related to causing the copy of the particular service to operate in an active mode on the other NFV service line card.

In a sixth implementation, alone or in combination with one or more of the first through fifth implementations, the server device hosts one or more services of the NFV service line card, the first traffic is the first data plane traffic, and the second traffic is the second data plane traffic, wherein the second traffic is generated by at least one service of the NFV service line card processing the first traffic.

In a seventh implementation, alone or in combination with one or more of the first through sixth implementations, the server device hosts one or more services of the NFV service line card, which include a first copy of a service; another server device provides another NFV service line card of the network device, wherein the other server device hosts one or more services of the other NFV service line card, which include a second copy of the service; and the first traffic is the first data plane traffic, and the second traffic is the second data plane traffic, wherein the process 500 includes: receiving, prior to sending the first traffic and via a third port, the first traffic; determining that the service is to be applied to the first traffic; and determining, using a load balancing technique and based on determining that the service is to be applied to the first traffic, that the first copy of the service is to be applied to the first traffic.

In an eighth implementation, alone or in combination with one or more of the first through seventh implementations, the server device hosts one or more services of the NFV service line card, which include a first copy of a service; another server device provides another NFV service line card of the network device, wherein the other server device hosts one or more services of the other NFV service line card, which include a second copy of the service, the first traffic is the first management plane traffic and includes one or more state update messages related to a state of the second copy of the service of the other NFV service line card, wherein the first traffic was generated by the second copy of the service of the other NFV service line card and was sent, from the other server device, to the network device via a third port of the network device; and the second traffic is the second management plane traffic and includes one or more state response messages related to the state of the second copy of the service of the other NFV service line card.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

Figure 6:
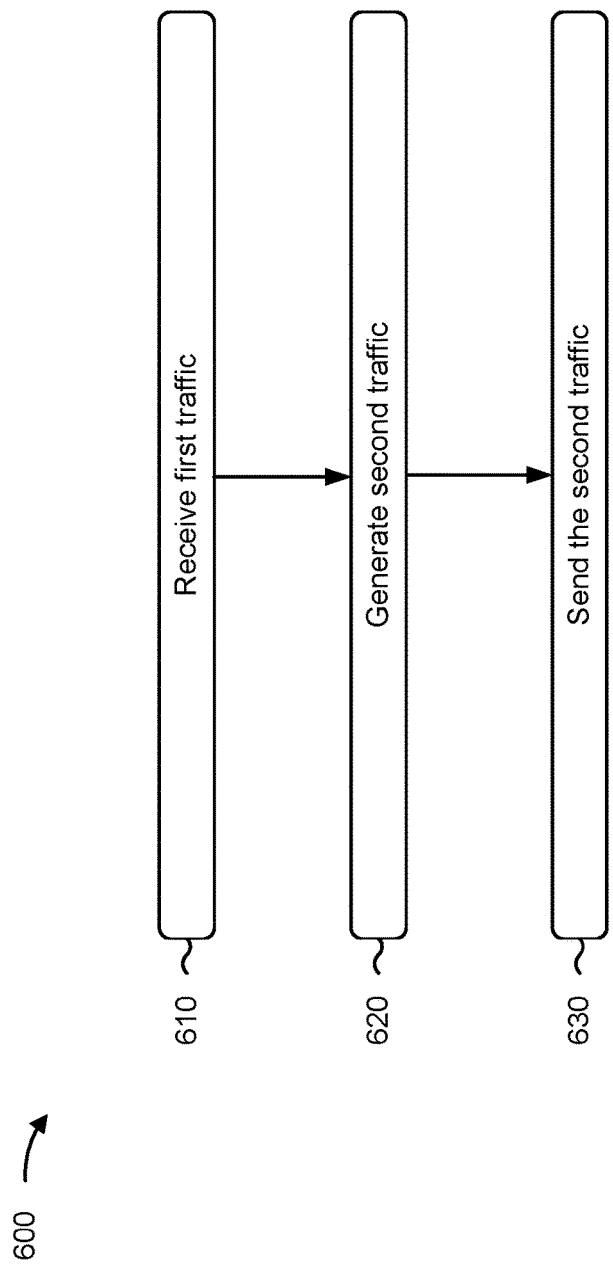

FIG. 6 is a flowchart of an example process 600 associated with facilitating elasticity of a network device. In some implementations, one or more process blocks of FIG. 6 are performed by a server device (e.g., the server device 230). In some implementations, one or more process blocks of FIG. 6 are performed by another device or a group of devices separate from or including the server device, such as an NFV system (e.g., the NFV system 220) and/or a network device (e.g., the network device 210). Additionally, or alternatively, one or more process blocks of FIG. 6 may be performed by one or more components of device 300, such as processor 320, memory 330, input component 340, output component 350, and/or communication component 360; one or more components of device 400, such as input component 410, switching component 420, output component 430, and/or controller 440; and/or one or more other components.

As shown in FIG. 6, process 600 may include receiving first traffic (block 610). For example, the server device may receive first traffic, as described above. In some implementations, server device may receive from a network device, and via a first port of the server device, the first traffic. In some implementations, the server device provides a NFV service line card of the network device. In some implementations, the first traffic is associated with the NFV service line card.

As further shown in FIG. 6, process 600 may include generating second traffic (block 620). For example, the server device may generate second traffic, as described above. In some implementations, the server device may generate, based on the first traffic, the second traffic, which may be associated with the NFV service line card.

As further shown in FIG. 6, process 600 may include sending the second traffic (block 630). For example, the server device may send the second traffic, as described above. In some implementations, the server device may send, to the network device and via a second port of the server device, the second traffic.

Process 600 may include additional implementations, such as any single implementation or any combination of implementations described below and/or in connection with one or more other processes described elsewhere herein.

In a first implementation, the server device is associated with an NFV system.

In a second implementation, alone or in combination with the first implementation, the first traffic includes one or more request messages related to configuring at least one service of one or more services of the NFV service line card hosted by the server device, and the second traffic includes one or more response messages related to configuring the at least one service.

In a third implementation, alone or in combination with one or more of the first and second implementations, the first traffic includes one or more request messages related to a health status of the server device, and the second traffic includes one or more response messages related to the health status of the server device.

In a fourth implementation, alone or in combination with one or more of the first through third implementations, the first traffic includes one or more first data messages, and the second traffic includes one or more second data messages.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network device, comprising:
one or more memories; and
one or more processors to:
send, via a first port of the network device and to a first server device, first traffic,
wherein the first server device provides a first network function virtualization (NFV) service line card of the network device, and
wherein the first traffic is at least one of first management plane traffic associated with the first NFV service line card, first control plane traffic associated with the first NFV service line card, or first data plane traffic associated with the first NFV service line card; and
receive, via a second port of the network device and from the first server device, second traffic,
wherein the second traffic is at least one of second management plane traffic associated with the first NFV service line card, second control plane traffic associated with the first NFV service line card, or second data plane traffic associated with the first NFV service line card; and
send, via a third port of the network device and to a second server device, third traffic,
wherein the second server device provides a second NFV service line card of the network device and the second server device hosts one or more services of the second NFV service line card.

2. The network device of claim 1, wherein the first server device is associated with an NFV system.

3. The network device of claim 1, wherein:
the first server device hosts one or more services of the first NFV service line card;
the first traffic is the first management plane traffic and includes one or more request messages related to configuring at least one service, of the one or more services, of the first NFV service line card; and
the second traffic is the second management plane traffic and includes one or more response messages related to configuring the at least one service.

4. The network device of claim 1, wherein:
the first traffic is the first management plane traffic and includes one or more request messages related to a health status of the first server device; and
the second traffic is the second management plane traffic and includes one or more response messages related to the health status of the first server device.

5. The network device of claim 1, wherein:
the first server device hosts one or more services of the first NFV service line card;
the first traffic is the first control plane traffic and includes one or more first liveness messages associated with a particular service, of the one or more services, of the first NFV service line card; and the second traffic is the second control plane traffic and includes one or more second liveness messages associated with the particular service.

6. The network device of claim 5,
wherein the one or more services of the second NFV service line card include a copy of the particular service, which is operating in a standby mode, and
wherein the third traffic is third management plane traffic associated with the second NFV service line card and includes one or more request messages related to causing the copy of the particular service to operate in an active mode on the second NFV service line card.

7. The network device of claim 1, wherein:
the first server device hosts one or more services of the first NFV service line card;
the first traffic is the first data plane traffic; and
the second traffic is the second data plane traffic,
wherein the second traffic is generated by at least one service of the first NFV service line card processing the first traffic.

8. The network device of claim 1, wherein:
the first server device hosts one or more services of the first NFV service line card, which include a first copy of a service;
the second server device hosts one or more services of the second NFV service line card, which include a second copy of the service; and
the first traffic is the first data plane traffic, and the second traffic is the second data plane traffic,
wherein the one or more processors are further to:
receive, prior to sending the first traffic and via the third port, the first traffic;
determine that the service is to be applied to the first traffic; and
determine, using a load balancing technique and based on determining that the service is to be applied to the first traffic, that the first copy of the service is to be applied to the first traffic,
wherein determining that the first copy of the service is to be applied to the first traffic causes the one or more processors to send, via the first port and to the first server device, the first traffic.

9. The network device of claim 1, wherein:
the first server device hosts one or more services of the first NFV service line card, which include a first copy of a service;
the second server device hosts one or more services of the second NFV service line card, which include a second copy of the service;
the first traffic is the first management plane traffic and includes one or more state update messages related to a state of the second copy of the service of the second NFV service line card,
wherein the first traffic was generated by the second copy of the service of the second NFV service line card and was sent, from the second server device, to the network device via the third port of the network device; and
the second traffic is the second management plane traffic and includes one or more state response messages related to the state of the second copy of the service of the second NFV service line card.

10. A non-transitory computer-readable medium storing a set of instructions, the set of instructions comprising:
one or more instructions that, when executed by one or more processors of a network device, cause the network device to:
send, via a first port of the network device and to a first server device that provides a first network function virtualization (NFV) service line card of the network device, first traffic associated with the first NFV service line card; and
receive, via a second port of the network device and from the first server device, second traffic associated with the first NFV service line card; and
send, via a third port of the network device and to a second server device, third traffic,
wherein the second server device provides a second NFV service line card of the network device and the second server device hosts one or more services of the second NFV service line card.

11. The non-transitory computer-readable medium of claim 10, wherein:
the first server device hosts one or more services of the first NFV service line card;
the first traffic includes one or more request messages related to configuring a particular service, of the one or more services, of the first NFV service line card; and
the second traffic includes one or more response messages related to configuring the particular service.

12. The non-transitory computer-readable medium of claim 10, wherein:
the first traffic includes one or more request messages related to a health status of the first server device; and
the second traffic includes one or more response messages related to the health status of the first server device.

13. The non-transitory computer-readable medium of claim 10, wherein:
the first server device hosts one or more services of the first NFV service line card;
the first traffic includes one or more first liveness messages associated with a particular service, of the one or more services, of the first NFV service line card; and
the second traffic includes one or more second liveness messages associated with the particular service.

14. The non-transitory computer-readable medium of claim 10, wherein:
the first server device hosts one or more services of the first NFV service line card;
the first traffic includes one or more first data messages; and
the second traffic includes one or more second data messages,
wherein the second traffic is generated by at least one service of the first NFV service line card processing the first traffic.

15. The non-transitory computer-readable medium of claim 10, wherein:
the first server device hosts one or more services of the first NFV service line card, which include a first copy of a service;
the second server device hosts one or more services of the second NFV service line card, which include a second copy of the service;
the first traffic includes one or more state update messages related to a state of the second copy of the service of the second NFV service line card; and
the second traffic includes one or more state response messages related to the state of the second copy of the service of the second NFV service line card.

16. A method, comprising:
receiving, by a first server device, from a network device, and via a first port of the first server device, first traffic, wherein the first server device provides a first network function virtualization (NFV) service line card of the network device,
wherein the first traffic is associated with the first NFV service line card;
generating, by the first server device and based on the first traffic, second traffic associated with the first NFV service line card; and
sending, by the first server device, to the network device, and via a second port of the first server device, the second traffic; and
sending, by the first server device, via a third port of the network device and to a second server device, third traffic,
wherein the second server device provides a second NFV service line card of the network device and the second server device hosts one or more services of the second NFV service line card.

17. The method of claim 16, wherein the first server device is associated with an NFV system.

18. The method of claim 16, wherein:
the first traffic includes one or more request messages related to configuring at least one service of one or more services of the first NFV service line card hosted by the first server device; and
the second traffic includes one or more response messages related to configuring the at least one service.

19. The method of claim 16, wherein:
the first traffic includes one or more request messages related to a health status of the first server device; and
the second traffic includes one or more response messages related to the health status of the first server device.

20. The method of claim 16, wherein:
the first traffic includes one or more first data messages; and
the second traffic includes one or more second data messages.

* * * * *